Sept. 13, 1949.  E. J. ISBISTER  2,481,515
METHOD AND APPARATUS FOR PULSE-ECHO
DISTANCE MEASURING Filed March 30, 1943  2 Sheets-Sheet 1

INVENTOR
ERIC J. ISBISTER
BY
ATTORNEY.

Sept. 13, 1949.  E. J. ISBISTER  2,481,515
METHOD AND APPARATUS FOR PULSE-ECHO
DISTANCE MEASURING
Filed March 30, 1943  2 Sheets-Sheet 2
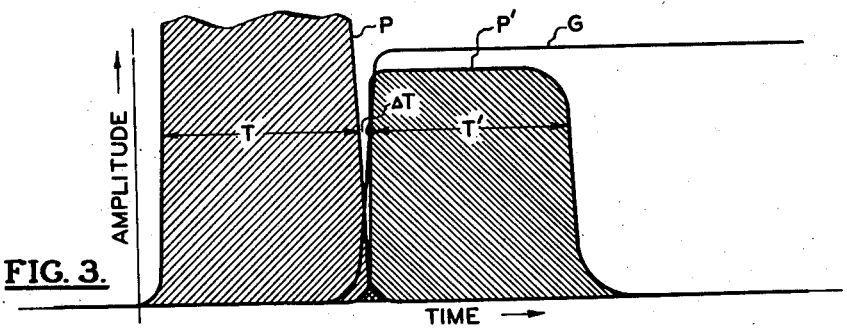
FIG. 3.
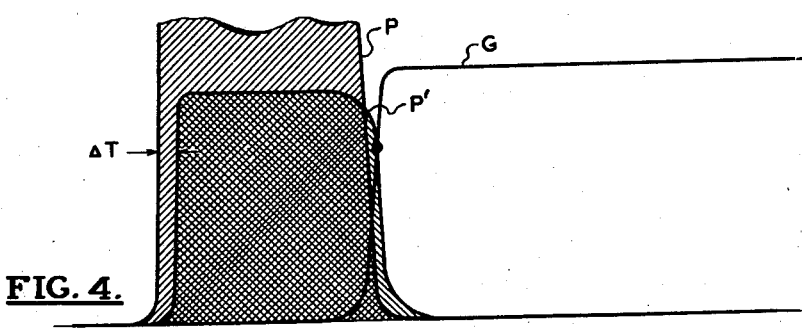
FIG. 4.
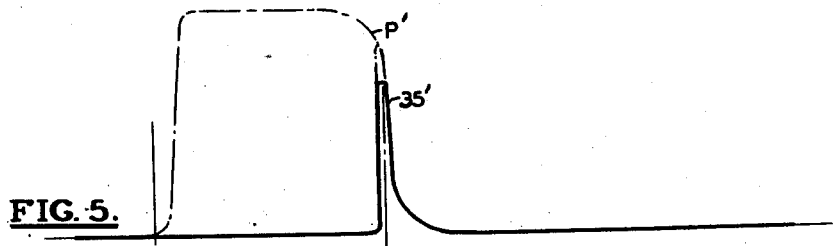
FIG. 5.
FIG. 6.
FIG. 7.
FIG. 8.
INVENTOR
ERIC J. ISBISTER
BY
Herbert H. Thompson
his ATTORNEY.

Patented Sept. 13, 1949

2,481,515

UNITED STATES PATENT OFFICE 2,481,515

METHOD AND APPARATUS FOR PULSE-ECHO DISTANCE MEASURING

Eric J. Isbister, Forest Hills, N. Y., assignor to The Sperry Corporation, a corporation of Delaware Application March 30, 1943, Serial No. 481,165

19 Claims. (Cl. 343—13)

This invention relates to distance measuring systems and, more particularly, to methods of and apparatus for shortening the minimum effective range of pulse type distance indicators.

It is common practice to irradiate distant objects with electromagnetic energy pulses of extremely short duration, and to determine the distance from the energy source to the object as a function of the time interval required for the energy to travel to and from the object. Normally, the reflected pulses are received by a mechanism closely associated with the transmitting mechanism, the receiving mechanism being provided with some form of distance indicator cooperative with both the transmitted and received pulses so as to measure the time interval between them. Although the transmitted electromagnetic pulses are of extremely short duration, e. g., of one microsecond, they nevertheless block the receiver for an appreciable time, and preclude the reception of reflected pulses until after the transmitted pulse has decayed. In the case of a system employing one microsecond pulses, the receiver normally is blocked for slightly over one mocrosecond, rendering the receiver insensitive to objects closer than approximately 600 feet.

By means of the present invention the minimum range of a system may be reduced considerably. The invention comprehends utilizing the characteristics of the end portion of the reflected wave for deriving distance indicating signals, whereby the directly transmitted and reflected pulses may have an overlapping time relationship.

The principal objects of the present invention are: to provide improved methods of and apparatus for determining distance with electromagnetic pulses; to provide in such a pulse system, metehods of and apparatus for reducing the minimum operating range; to provide a pulse-type distance indicator whose minimum range is substantially independent of the duration of the transmitted pulses; to provide methods of and apparatus for measuring a reflected pulse before the transmitted pulse is terminated; and to provide an improved system for initiating the sweep of a cathode ray distance indicator. These and other objects will become more apparent from the following description and the accompanying drawings, wherein:

Figs. 3 and 4 are enlarged views of waveforms showing the minimum range relationships between transmitted and reflected pulses under the former and present improved methods, respectively.

Fig. 5 is a diagram of a clipped reflected pulse.

Fig. 6 is a diagram of signals formed by differentiating the pulse shown in Fig. 5.

Fig. 7 is a diagram showing the signals of Fig. 6 after the first signal has been clipped, and the second inverted.

Fig. 8 is a graph showing an improved method of utilizing a sweep circuit.

Figure 1:
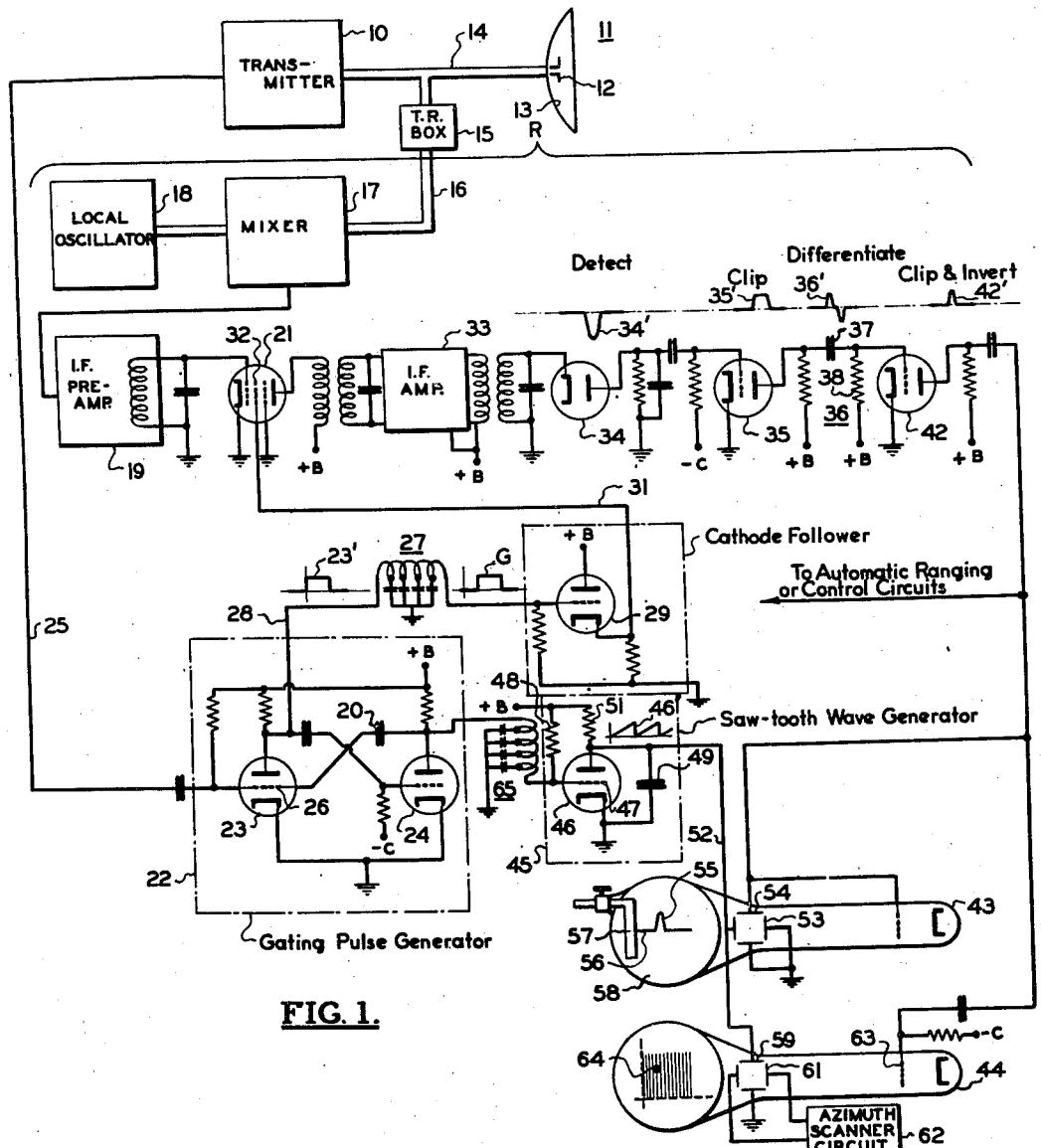
Fig. 1 is a combined schematic wiring diagram and block diagram of one system incorporating features of the present invention.

Generally speaking, the present invention comprehends clipping and differentiating the latter portion only of a reflected pulse, the fore part of which is rejected, so as to form positive and negative pips at the beginning and end of said latter portion of the reflected pulse, respectively. The pip corresponding to the front end of said latter portion of the pulse is rejected, and the remaining pip is utilized to form a distance indication as a function of the time interval between the end of the transmitted pulse and the end of the reflected pulse, though actually measured from the beginning of the transmitted pulse.

It is generally recognized in systems employing electromagnetic pulses for distance indication that the receiving mechanism is insensitive to reflected pulses while the radiant energy is being transmitted. Although an overload control device or limiter ordinarily is used to by-pass transmitted energy from the receiver, a sufficient portion of the transmitted energy nevertheless reaches the receiver and renders it insensitive to the much weaker reflected pulses, in much the same way that a loud sound blankets echoes reflected to the sound source. Thus, if a sound pulse is projected toward a distant reflector, the echo normally cannot be heard until the sound pulse terminates, and the minimum range over which an echo may be heard is limited by the duration of the sound pulse. With electromagnetic distance measuring systems, the blocking of the receiver during the transmission of pulses may seriously affect the minimum operating range, even though the pulses are brief, because the electromagnetic energy travels long distances during short periods.

The minimum theoretical range for such a system may be indicated mathematically according to the equation:

$$S_m = K(T + \Delta t) \quad (1)$$

where $S_m$ = the distance to the nearest target in feet, $T$ = the duration of the transmitted pulse in microseconds, $\Delta t$ = the receiver-conditioning time in microseconds, and $K$ is a scale factor roughly equal in the case of light and radio waves to $\frac{186{,}000 \times 5280}{2 \times 10^6}$ It becomes apparent from the foregoing equation that in normal practice the minimum distance $S_m$ is a direct function of the duration of the transmitted pulse plus an additional time interval required to condition the receiver following the transmission of each pulse. Since radio waves travel approximately 1,000 feet per microsecond, the limitation that no signals can be received while the pulse is being transmitted renders such a system insensitive to objects located closer than 500 feet when the pulse lasts for one microsecond, with proportionately greater distance for longer lasting pulses.

With the present proposed system, use is made of the fact that for near objects, the duration $T$ of the transmitted pulse is for practical purposes, identical with the duration $T'$ of the reflected pulse. Accordingly, by deriving a distance indicating signal or pulse at the end of each reflected pulse, the time at which the front of the reflected pulse arrives may be determined by subtracting the time $T'$ of the duration of the reflected pulse, from the total travel time of the pulse. The minimum distance may then be determined by the equation:

$$S_m = K[(T + \Delta t) - T'] \quad (2)$$

but since $T$ and $T'$ are substantially identical, Equation 2 reduces to:

$$S_m = K\Delta t$$

Hence, the minimum distance over which objects may be detected is rendered independent of the duration of the pulse and becomes dependent principally on the increment of time required to condition the receiver following the transmission of a pulse.

Figure 2:
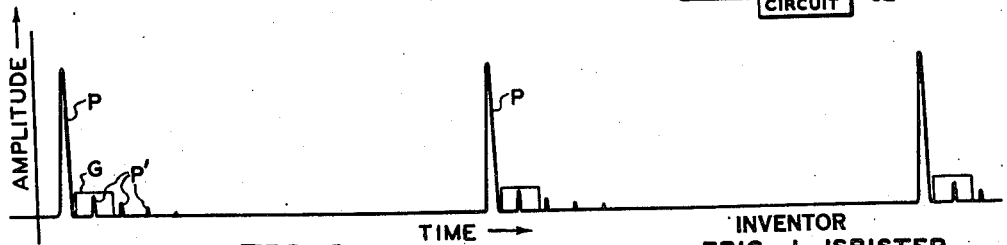
Fig. 2 is a graph diagrammatically illustrating the time relationship between the transmission of successive pulses, and the reception of pulses reflected from remote objects.

The foregoing principles are illustrated graphically in Figs. 2, 3 and 4 exemplifying typical operating conditions. In Fig. 2 two complete pulsing cycles are shown, the time interval between pulses being a function of the pulse frequency. For example, transmitted pulses P may be produced at a frequency of 2,000 cycles per second so that the interval between successive pulses is 500 microseconds. The receiving mechanism R, shown in Fig. 1, is conditioned for operation immediately following each pulse P by applying a gating pulse G to the receiver so as to render it sensitive to reflected pulses P' formed by the re-radiation of electromagnetic energy from reflecting objects. In order to minimize the average noise level of the receiver it is customary to terminate the gating action when the time required for pulses P' to arrive from the maximum range has elapsed. Under a typical operating condition, the gating pulse may be terminated after 50 microseconds, providing a maximum range of approximately five miles, so that the receiver is operative to reflected pulses P' during roughly $\frac{1}{10}$ of the period between successive transmitted pulses, at 2,000 cycles per second. The receiver being inoperative whenever the gating pulse is off, no reflected pulses can be received except those acting on the receiver concurrently with the gating pulse. Hence, in Fig. 2, the pulse P' located within the gating pulse wave G is detected by the receiver while the following pulses P' are not detected.

The relationship of the received pulses P' to the transmitted and gating pulses is more clearly indicated in Figs. 3 and 4, especially with regard to the minimum range over which the receiver is operative. Fig. 3 discloses a customary arrangement wherein the gating pulse G conditions the receiver R immediately following the transmitted pulse P. The pulse P' is received and detected at a time following the origin of the pulse P by an interval equal to the duration $T$ plus the time interval $\Delta T$. To permit the apparatus to function over the minimum possible range, it was customary to locate the gating pulse G as shown in Fig. 3, so that the receiver became operative at the instant that the transmitted pulse P decayed to a point that would not adversely affect receiver operation. A slight additional time increment often was allowed as a safety factor to guard against the receiver being turned on prematurely, to avoid damage resulting from the excessive energy in the pulse P. Since the sensitivity of the receiver to the reflected pulse was dependent upon the transmitted pulse having decayed, the minimum operating range of a device functioning according to Fig. 3 was unnecessarily extended by the duration $T$ of the transmitted pulse P.

The condition has been improved considerably by utilizing the slope of the end of reflected pulse P' during the decay of the pulse P, though the gating pulse G is left in the same relation to the transmitted pulse P. The pulse P' may be measured effectively by detecting its trailing end, and allowing for its duration in the distance indicator. The minimum range accordingly is reduced to the short safety-factor time interval $\Delta T$ required for conditioning the receiver, as illustrated in Fig. 4.

One form of apparatus which may be employed in thus reducing the minimum operating range will become apparent from a more detailed consideration of Fig. 1. The apparatus comprises a transmitter 10 adapted to supply periodic electromagnetic pulses P of brief duration to a radiating antenna system 11. The radiating system may comprise an antenna 12 and a reflector 13, either stationary or mounted to oscillate and of any suitable design for collimating the energy and projecting it into space. With ultra short waves having a wavelength of the order of one decimeter, the radiating system 11 may comprise a parabolic sheet metal reflector provided with a radiating dipole fed by a wave guide 14 extending from the transmitter 10.

A T—R box or limiter 15 for by-passing or shunting out transmitted energy provides a high impedance path for the direct energy from the transmitter 10, and a low impedance path to reflected pulses returning to the antenna system 11 following decay of each pulse P, and conditioning of the receiver. An example of such a device is illustrated in U. S. Patent No. 2,439,656. The reflected pulses continue through wave guide 16 to a mixer 17 where the pulses heterodyne with the signals formed by a local oscillator 18. The resultant intermediate frequency signals pass through a pre-amplifier 19 to a gating tube 21 which normally is maintained in an inoperative condition so as to desensitize the receiver except for the brief gating period following the transmission of a pulse P.

A typical gating pulse generator 22 adapted to render the tube 21 intermittently operable comprises a conventional electronic multi-vibrator having a normally conductive tube 23 and a normally non-conductive tube 24. A negative impulse from the transmitter 10, synchronized with each pulse transmission, is applied through wire 25 to the grid 26, rendering the tube 23 inoperative and tube 24 operative until the condenser 20 is recharged enough to bring the grid 26 of tube 23 above cutoff, at which time the tubes revert to their original condition. Thus, a substantially square wave or pulse 23' is formed by the tube 23, for use in connection with gating the tube 21.

While pulse 23' is formed conveniently by triggering the generator 22 in synchronism with the transmission of a pulse P, the wave 23' must be delayed for a period approximately equal to the duration T of the transmitted pulse P so as to retard the conditioning of the receiver until the pulse P has decayed sufficiently. A delay network 27 consisting of series inductors and parallel capacitors forming a group of T-section filters is useful for this purpose, and is interposed in the lead 28 extending from the tube 23. The gating pulse G leaving the network 27 is similar to the pulse 23' except for the time displacement effected by the delay network.

The pulse G may be passed through a cathode follower or cathode-coupled stage 29 to provide proper impedance matching to a low impedance concentric line or other conduit 31 extending to a control element in the gating tube 21, and adapted to preserve the generally square shape of the wave G. By connecting the conduit 31 to the screen grid 32 of the tube 21 the gating wave or pulse G applies screen grid voltage to the tube 21 to render that tube quickly conductive, and thereby conditions the receiver for the reception of reflected pulses P'.

One or more additional intermediate frequency amplifier stages are provided for the received signals by the intermediate frequency amplifier 33, the output circuit of which connects with a detector 34 in a conventional manner. Negative pulses 34' are formed in the plate circuit of the detector 34 as indicated in Fig. 1. Each such negative pulse biases the following tube 35 beyond the cut-off point and forms a clipped positive voltage pulse 35' in the plate circuit as indicated.

Deriving a signal from the tail end of the reflected pulses P' may be obtained in a differentiating circuit 36, comprising an R—C circuit having a time constant short with respect to the duration of the pulse in the input coupling circuit to the tube 42. The circuit 36 comprises a coupling condenser 37 and an input resistor 38, either or both of which are of sufficiently low value as to provide input signals 36' responsive to the change in the slope of the wave form 35'.

The change in the slope of the front and trailing ends of the received pulse is more sharply defined by the clipping operation occurring in the tube 35, as is more apparent from the enlarged view of the clipped pulse 35' appearing in Fig. 5. Only a small end portion of the reflected wave P' energizes the receiver in the extreme case shown in Fig. 5 because the receiver is blocked until the pulse P decays to below a predetermined safe level. Electrical differentiation of the pulse 35' produces positive and negative pips 39 and 41, respectively, on the pulse 35' as more clearly indicated in Fig. 6. The pips 39 and 41 represent the sudden changes in the slope of the received front and trailing ends of each received pulse 35', the pip 41 being a function of the rate at which the pulse 35' decays.

The negative pip 41 may be completely separated from the positive pip 39 by passing the signal 36' through the tube 42 operated at substantially plate current saturation by applying a positive direct current voltage to the free end of grid resistor 38, so that the output voltage signal 42' comprises a single positive pip representing an inversion of negative pip 41 by virtue of the usual reversal occurring in a thermionic tube. As shown in Fig. 7 the positive pip 39 is clipped from the wave 36' during its passage through tube 42, since this pip does not affect the normal flow of plate current, and hence does not vary the plate voltage.

The output signal 42' may serve as a time indication of the trailing portion of the reflected pulse P', and since the duration T' of each pulse P' is known, the total travel time from the front of pulse P to the front of pulse P' may be determined readily by allowing for the time T'. With this proper allowance for T', the signal 42' may be utilized to provide a distance indication of an object located at a distance corresponding to the small increment ΔT. Simple allowance for the duration T' may be made by properly orienting the zero range line relative to the distance indication formed on the cathode ray tube or other indicating device, as will appear.

Any form of indicator suitable to the purpose may be used. Fig. 1 discloses a pair of cathode ray tubes 43 and 44 which may be used together or in the alternative to provide a suitable indication of the range or distance of the object. The tubes 43 and 44 each utilize a conventional time sweep, provided for example, by a sawtooth wave generator 45. The generator 45 comprises a thermionic tube 46 having a normally conductive grid circuit 47, maintained at a positive potential by a relatively large resistor 48 connected to a supply of positive direct current voltage. Each time the multivibrator 22 trips, a large negative pulse is applied to the grid circuit 47 rendering tube 46 non-conductive, and allowing the condenser 49 gradually to build up a charge from a source of positive voltage supplied through a large resistor 51, forming the wave 46' shown in Fig. 8. The rate at which the condenser 49 charges depends upon its capacity and the rate at which current flows through the resistor 51, according to well known principles. As the condenser 49 is allowed to charge to only a fraction of the supply voltage during an interval between the start and end of the condenser charging operation, the voltage across the condenser increases as a substantially linear function of time, and may be utilized as a sweep circuit voltage on either or both of the tubes 43, 44 in well known manner. The condenser 49 discharges abruptly through the tube 46 when the generator 22 trips back to its original condition upon decay of the exciting pulse.

The respective tubes 43, 44 illustrate two systems for producing a distance indication. In the tube 43, sawtooth wave 46' may be conducted through wire 52 to the horizontal deflection plates 53 so as to produce a horizontal displacement as a function of the time following the transmission of each pulse. An indication of distance may be provided by applying the signal 42' to the vertical deflecting plates 54, so as to produce a vertical deflection 55 in the trace 56 at a distance spaced from any conveniently arranged zero index 57 located near the left hand side of the screen 58 of the tube 43. It will be apparent that proper compensation for the time interval T' may be made by suitable adjustment between the index 57 and the deflection 55 according to experimental determinations with objects at known distances, or by calculation.

In the tube 44 a different type of distance indication is provided, coupled with a goniometric indication of the position of the object in space, e. g., with respect to a fixed azimuthal index. The sawtooth wave 46' is applied to the vertical deflection plates 59 to provide a vertical sweep of the signal trace at the pulse rate. In addition, a horizontal sweep signal is applied to the horizontal deflection plates 61 by the sweep voltages produced in an azimuth or other scanning circuit 62 synchronized with any motion the reflector 13 may have, all in well known manner. The output signal 42' may be applied to the control grid 63 of the tube 44 to provide a momentary brightening of the trace 64 at a position on the tube designating distance of the reflecting object from the source as one coordinate, and azimuthal orientation of the object as another coordinate.

Since the generator 22 is triggered at the instant that each pulse P is transmitted, it may be desirable to interpose a delay network 65 between the generator 22 and the tube 46 to compensate for the duration T or T'. Otherwise as shown in Fig. 8, the initial portion 50 of the sawtooth wave 46' may be eliminated by proper orientation of the index 57, thereby utilizing only that portion of the sawtooth wave having most nearly linear characteristics, and rejecting the nonlinear portion 50.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a method of measuring the distance of remote objects from a radiator, the steps comprising irradiating said objects with transmitted electromagnetic pulses, measuring the time for reflected pulses to arrive from said objects, and deriving a distance-denoting signal by differentiating the decaying end of the pulses reflected from said objects.

2. In a method of measuring the distance to remote objects from a radiator, the steps comprising irradiating said objects with transmitted electromagnetic pulses, measuring the time for said pulses to travel to and from said object, and deriving a distance denoting signal by differentiating the decaying end of the pulses reflected from said object as they overlap said transmitted pulses.

3. A method of measuring the distance between an electromagnetic pulse radiator and a remote object, comprising projecting electromagnetic pulses to said object, receiving pulses reflected from said object, blanking out said reflected pulses during the radiation of each electromagnetic pulse, and deriving distance signals by differentiating the trailing end of said reflected pulses.

4. A method of measuring the distance between an electromagnetic pulse radiator and a remote object, comprising projecting electromagnetic pulses to said object, receiving pulses reflected from said object, blanking out said reflected pulses during the radiation of each pulse, forming signal pulses as a function of the slope of the trailing end of each of said reflected pulses, and forming distance indications in response to said signals as a function of the time interval between the trailing end of said electromagnetic pulses and the trailing end of said reflected pulses.

5. A method of measuring the distance between an electromagnetic pulse radiator and a remote object, comprising projecting electromagnetic pulses to said object, receiving pulses reflected from said object, blanking out said reflected pulses during the radiation of each pulse, deriving signals representing said reflected pulses only when said reflected pulses decay, forming distance indications in response to said signals as a function of the time interval between the beginning of the respective transmitted pulses and the decaying end of the corresponding reflected pulses, and in forming said indications, compensating for the duration of one of said pulses.

6. Distance-measuring apparatus comprising a radiator of electromagnetic-pulses, a receiver of electromagnetic-pulses reflected from an irradiated object, said receiver including signal means for deriving signals from said reflected pulses, means for delaying the operation of said signal means until the respective reflected pulses decay, and indicator means for forming distance indications as a function of the time interval between the end of the radiated and received pulses respectively.

7. In a distance indicator having means for irradiating objects with electromagnetic pulses and for receiving pulses reflected from said objects, the combination comprising signal means for deriving signals from said reflected pulses, means responsive to the decaying of said reflected pulses for rendering said signal means operative, and means for producing distance indications from said signals as a function of the total travel time of said pulses.

8. In a distance indicator having means for irradiating objects with electromagnetic pulses and for receiving pulses having finite duration reflected from said objects, the combination comprising means for deriving signals representing the derivative of the decaying end of said reflected pulses, means for producing distance indications from said signals as a function of the travel time of said pulses, and means for compensating said indications because of the duration of said reflected pulses.

9. In a distance indicator having a radiant energy pulse radiator and a receiver for detecting pulses reflected from distant objects, the combination comprising means for differentiating said reflected pulses to form signals occurring at the end of the duration of said reflected pulses, and distance-indicating means controlled by said signals.

10. The combination as claimed in claim 9 including a clipping circuit for said reflected pulses.

11. In a distance indicator having a radiant energy pulse radiator and a receiver for detecting pulses reflected from distant objects, the combination comprising a differentiating circuit cooperative with said pulses to form signals at the beginning and end of said detected pulses, means for rejecting the signals formed at the beginning of said detected pulses, and indicator means responsive to the remaining signals to form a distance indication as a function of the travel time of said pulses.

12. Distance measuring apparatus comprising a transmitter of electromagnetic pulses, a receiver for detecting pulses reflected from distant objects, means for blocking said receiver except for a period immediately following the transmission of each pulse, and means for deriving distance-indicating signals from only the tail end of said detected reflected pulses.

13. A method of enlarging the range limits of an electromagnetic pulse range determiner comprising the steps of reducing the time separation between an initial transmitted electromagnetic energy pulse and a reflective pulse substantially overlying said first pulse, differentiating a final portion of said second pulse and determining range as a function of the time difference between said differentiated portion and said initial pulse.

14. A method of enlarging the range limits of an electromagnetic pulse range determiner comprising the steps of reducing a separation between a first pulse and a second pulse, portions of both pulses overlapping and having remaining non-overlapping portions substantially equal, converting said latter pulse into an extremely narrow pulse, and determining range as a function of time lapse between said first pulse and said narrow pulse.

15. In radio range-measuring apparatus, a radio pulse transmitter, a radio receiver for receiving a transmitted pulse after reflection from a distant object, means for providing in the output of said receiver only that portion of the reflected pulse that does not overlap the transmitted pulse in a time sense, means connected to the output of said receiver for providing a reference pulse occurring at the time of the decaying, trailing edge of the received pulse for time comparison with one edge of the transmitted pulse, and means controlled by said reference pulse and an edge of the transmitted pulse for supplying a measure of the range of said object.

16. In radio range-measuring apparatus, a radio pulse transmitter, a radio receiver for receiving a transmitted pulse after reflection from a distant object, means connected to the output of said receiver for providing a reference pulse occurring at the time of the decaying, trailing edge of the received pulse for time comparison with one edge of the transmitted pulse, and means controlled by said reference pulse and an edge of the transmitted pulse for supplying a measure of the range of said object.

17. A method of measuring range which comprises transmitting a radio pulse to a remote object, receiving said pulse after reflection from said object, deriving from the reflected pulse only that portion thereof that, in time, does not overlap the transmitted pulse, forming a reference pulse at the time the decaying, trailing edge of the non-overlapping portion of said reflected pulse occurs, and comparing the time of occurrence of said reference pulse with the time of occurrence of one edge of said transmitted pulse to thereby provide a measure of range to said object.

18. In radio range-measuring apparatus, a radio pulse transmitter, a radio receiver for receiving a transmitted pulse reflected from a distant object, means for providing in the output of said receiver only that portion of the reflected pulse that does not overlap the transmitted pulse in a time sense, differentiating means connected to the output of said receiver for providing a reference pulse occurring at the time of the decaying, trailing edge of the received pulse for time comparison with one edge of the transmitted pulse, and means controlled by said reference pulse and an edge of the transmitted pulses for supplying a measure of range to said object.

19. A method of measuring range which comprises transmitting a radio pulse to a remote object, receiving said pulse after reflection from said object, deriving from the reflected pulse only that portion thereof that does not overlap the transmitting pulse, differentiating said non-overlapping portion of the reflected pulse to form reference pulses occurring in timed relation to the leading and trailing edge of said non-overlapping portion of the reflected pulse, and comparing the time of occurrence of the reference pulse derived from the trailing edge of the reflected pulse with one edge of said transmitted pulse to thereby provide a measure of range to said object.

ERIC J. ISBISTER.

REFERENCES CITED

The following references are of record in the file of this patent:

UNITED STATES PATENTS

| Number | Name | Date |
|---|---|---|
| 1,585,591 | Lowy | May 18, 1926 |
| 2,208,422 | Hugon | July 16, 1940 |
| 2,226,706 | Cawein | Dec. 31, 1940 |
| 2,287,174 | Heising | June 23, 1942 |
| 2,313,906 | Wendt | Mar. 16, 1943 |
| 2,391,411 | Goble et al. | Dec. 25, 1945 |
| 2,421,340 | Levy | May 27, 1947 |

FOREIGN PATENTS

| Number | Country | Date |
|---|---|---|
| 113,233 | Australia | June 2, 1941 |
| 543,117 | Great Britain | Feb. 11, 1942 |